(12) United States Patent
Sinha

(10) Patent No.: US 6,524,640 B1
(45) Date of Patent: Feb. 25, 2003

(54) HIGH SOLIDS CONTAINING PROCESSED AND SHELF-STABLE VEGETABLES

(75) Inventor: Nirmal K. Sinha, Frankfort, MI (US)

(73) Assignee: Graceland Fruit, Inc., Frankfort, MI (US)

( * ) Notice: Subject to any disclaimer, the term of this patent is extended or adjusted under 35 U.S.C. 154(b) by 0 days.

(21) Appl. No.: 09/696,040

(22) Filed: Oct. 25, 2000

(51) Int. Cl.$^7$ .............................. A23B 7/08; A23L 1/212
(52) U.S. Cl. ..................... 426/639; 426/506; 426/524; 426/640
(58) Field of Search ................... 426/639, 640, 426/524, 506

(56) References Cited

U.S. PATENT DOCUMENTS

| | | | |
|---|---|---|---|
| 2,420,517 A | * 5/1947 | Brandner et al. | ........... 426/639 |
| 2,785,071 A | 3/1957 | Mathews | |
| 3,634,104 A | * 1/1972 | Kaplow | ........... 99/204 |
| 4,183,963 A | * 1/1980 | Brimelow et al. | ........... 426/321 |
| 4,256,772 A | 3/1981 | Shanbhag et al. | |
| 4,542,033 A | 9/1985 | Agarwala | |
| 4,551,348 A | 11/1985 | O'Mahony et al. | |
| 4,683,141 A | 7/1987 | Lewis et al. | |
| 4,713,252 A | 12/1987 | Ismail | |
| 4,832,969 A | 5/1989 | Lioutas | |
| 4,946,693 A | 8/1990 | Risler et al. | |
| 5,000,972 A | 3/1991 | Nafisi-Movaghar | |
| 5,320,861 A | 6/1994 | Mantius et al. | |
| 5,368,873 A | 11/1994 | Aebi et al. | |
| 6,001,407 A | 12/1999 | Lewis et al. | |

OTHER PUBLICATIONS

Lori, Dahm, Food R & D, Refrigerated & Frozen Foods, Jul. 2000, pp. 34, 36–39.
Michael S. Curiale, Limiting Growth: Microbial Shelf–Life Testing, Food Product Design, Feb. 1998.
Guohus Cao et al., Antioxidant Capacity of Tea and Common Vegetables, J. Agric. Food Chem. vol. 44, No. 11, 1996, pp. 3426–3431.
W. C. Griffin et al., Polyhydric Alcohols, Chapter 10, Handbook of Food Additives, 2nd Edition, pp. 431–455, 1972.
Danila Torreggiani et al., Osmotic Dehydration of Fruit, Journal of Food Processing & Preservation 12 (1987), pp. 27–44.
Larry R. Beuchal, Microbial Stability as Affected by Water Activity, Cereal Foods World, Jul. 1981, vol. 26, No. 7, pp. 345–349.
C. R. Lerici et al., Osmotic Dehydration of Fruit: Influence of Osmotic Agents on Drying Behavior and Product Quality, Journal of Food Science, vol. 50 (1985), pp. 1217–1220.

* cited by examiner

*Primary Examiner*—Helen Pratt
(74) *Attorney, Agent, or Firm*—Price, Heneveld, Cooper & DeWitt & Litton

(57) ABSTRACT

The method for making high solids containing vegetables comprises immersing vegetables in a liquid of predetermined Brix until the vegetables reach a level of about 28 Brix to about 40 Brix where the liquid contains corn syrup, glycerin, and salts, removing the vegetables from the immersion, optionally spraying with vegetable oil prior to drying, and drying the vegetables.

28 Claims, No Drawings

HIGH SOLIDS CONTAINING PROCESSED AND SHELF-STABLE VEGETABLES

BACKGROUND OF THE INVENTION

The present invention relates to a process for fully processed shelf-stable vegetables. The consumption of fruits and vegetables has taken new importance in our diet because of their role in minimizing certain degenerative diseases and in enhancing our quality of life. These plant products are low in fat and high in natural antioxidant vitamin A and vitamin C. Cao et al. (1996) indicated that based on a serving size, kale, beets, red peppers, brussels sprouts, broccoli flowers, spinach, potatoes, and corn are likely to provide the largest amount of antioxidant as determined by oxygen radical absorbency score ($ORAC_{Roo.}$). However, vegetables are seasonal and perishable. Moreover, vegetables typically require washing, peeling, cutting, and cooking before they can be consumed.

Various preservation methods such as freezing, canning, freeze drying, air drying, and vacuum drying are processes that prevent or minimize chemical, enzymatic, and microbial changes leading to quality loss and spoilage are aimed at extending the life and the uses of vegetables. In most instances, a frozen vegetable is closer in quality characteristics to the fresh produce than a canned or dried vegetable. A frozen vegetable is also perishable, like fresh produce, and requires the steps of thawing and cooking before consumption. A canned vegetable is shelf-stable when the cans are unopened, but canned vegetables lack fresh vegetable characteristics. Dried vegetables tend to be discolored and therefore, are not appealing. Recently developed dehydrofrozen vegetables containing 40% to 50% moisture are partially dried and frozen products. These products have more solids than the frozen or individually quick frozen (IQF) vegetables and are used in food preparations because of their ease of handling and value per pound basis. However, these vegetables also require frozen storage.

I am currently aware of two patents relevant to my high solids containing processed vegetables and the process therefore. U.S. Pat. No. 4,832,969 (Lioutas), disclosed a process using fresh vegetables for manufacturing dried green vegetables, especially broccoli florets and pea-pods. The invention is an immersion bath having five times the weight of the vegetables processed made up of buffering systems and antioxidants. The water activity of the finished product ($A_w$) is given as 0.3 to 0.85. The product may contain a high proportion of glycerin and salt. The very high levels of salt make the vegetables taste salty. The higher levels of glycerin potentially lead to bitterness and stickiness in the dried product. The shelf-life of the products is not clearly apparent (the color stability is given as six months) and the water activity ($A_w$) range indicated is very broad (0.3 to 0.85). I believe that at higher $A_w$ (beyond 0.65), the products would need preservatives or low temperature storage to prevent microbial spoilage. To the applicant, this process appears rather cumbersome for industrial scale production as it uses a complex treatment mixture and processing steps.

U.S. Pat. No. 5,368,873 (Aebi et al.), discloses a process for preparing low moisture green bell peppers and onions by immersing the vegetables in an osmotic solution made up of high fructose corn syrup, corn syrup, glucose, fructose, maltose, sorbitol, maltitol honey, hydrogenated corn syrup or mixtures thereof. Next, the vegetables are removed and dried. This process results in heavily coated vegetables that tend to cling together when dried.

SUMMARY OF THE INVENTION

In the present invention, high solids containing vegetables are produced by immersing vegetables in a liquid of predetermined Brix until the vegetables reach a level of about 28 Brix to about 40 Brix where the liquid contains corn syrup, glycerin, and salt, removing the vegetables from the immersion, and drying the vegetables. Optionally, the vegetables may be sprayed with a vegetable oil prior to drying the vegetables. The resulting product has a high solid content and is soft, moist, and fresh-like in taste, texture, and appearance. It is also shelf-stable, microbiologically safe and ready to use.

These and other features, advantages and objects of the present invention will be further understood and appreciated by those skilled in the art by reference to the following specification, claims.

DETAILED DESCRIPTION OF THE PREFERRED EMBODIMENTS

In the preferred embodiment, individually quick frozen vegetables are immersed in an immersion bath of from about 40 Brix to about 60 Brix at a temperature of from about 110° F. to about 130° F., for a time sufficient to bring the vegetables from a low of about 4 Brix to about 6 Brix to a level of about 28 Brix to about 40 Brix. The high solids containing vegetables are removed and preferably rinsed with a diluted immersion medium. They are then preferably lightly sprayed with vegetable oil, and then dried to a water content of about 8% to about 15% and a water activity of about 0.4 to 0.6. The soluble (sugars) solid and non-soluble (starches, celluloses, hemicelluloses, and fibers) solid content of the processed vegetables will be from about 84% to about 92%.

The Vegetables

The starting materials for the patent application are individually quick frozen (IQF) vegetables and preferably USDA grade-A vegetables. These vegetables are either diced or whole (as in the case of sweet corn or garden green peas). The use of individually quick frozen vegetables allow for the separation of the initial preparatory steps of sorting, grading, cutting, peeling, blanching, etc., that are routine plant operations involved with fresh vegetables performed at the point of a vegetable production. Using IQF vegetables affords additional flexibility. A processing plant making the high solid containing value added, shelf-stable product of the present invention does not need to be: near a vegetable growing area and the processing operations can be performed year round.

The Immersion Bath

Next, the individually quick frozen vegetables are immersed in an immersion bath, that is a liquid medium of predetermined Brix as measured on the Brix scale. The Brix scale is a hydrometer scale for sugar solutions, graduated so that its readings at a specified temperature represent percentages by weight of sugar in the solution.

The immersion processing of vegetables is intended to increase the vegetable soluble solids content from an initial low of about 4 Brix to about 6 Brix to a level of about 28 Brix to about 40 Brix, depending on the vegetable. The increased soluble solids bind with the available water content of the vegetables. Thus, the immersion manages the state and concentration of water in the vegetable. Binding and retaining this water is central to maintaining a vegetable's shape, texture, and overall fresh-like quality. The immersion liquid also stabilizes the color of a vegetable and aids in the retention of nutrients by binding with these constituents so they may not be freely available for oxidative, enzymatic, and other degradations.

The key consideration in selecting the components of the immersion liquid here are: a natural, preservative or additive free product, the ability to maintain the natural taste and flavor of vegetables, the simplicity of handling and monitoring, recyclability, cost, and availability. Previously, chemicals, buffering systems, surfactants and antioxidants have been used. However, on an industrial scale, processes incorporating these ingredients are cumbersome to monitor and manage and the natural and preservative or additive free image of the finished product is compromised.

In contrast, the process of the present invention requires only three ingredients in its immersion solution. All are considered natural. The three ingredients are: corn syrup, glycerin, and iodized salt. Corn syrup comprises the main ingredient (about 88% to about 92%) followed by glycerin (about 6.5% to about 10.0%—based on the weight of immersion liquid) and salt (about 1.0% to about 2.0%—based on the weight of a vegetable processed).

The preferred corn syrup is designated as 62/43 product with the following properties:

| | |
|---|---|
| Dextrose Equivalent (DE): | 62 |
| Baume @ 100F: | 43 |
| Total solids (%): | 82 |
| Glucose (dextrose): | 36 |
| Maltose: | 31 |
| Trisccharides: | 13 |
| Higher sccharides: | 20 |
| Viscosity (poise): | 30 at 120° F. and 90 at 100° F. |

Unlike high fructose corn syrup, which contain about 42% to about 95% fructose, the corn syrup used here is of lower sweetness intensity because it is high in maltose and other higher saccharides that are not as sweet as fructose or sucrose. The relative sweetness of the sugars is given as: sucrose—1.0, glucose—0.5 to 0.6, fructose—1.4 and maltose—0.3 (Griffin and Lynch, 1968). The sweetness intensity of this corn syrup is further lowered by lowering the corn syrup's original Brix from about 82 Brix to as low as about 40 Brix, in some cases by diluting with water.

The preferred immersion medium formulation includes corn syrup, glycerin, and salt. The presently preferred formulas for each vegetable are given in example 1 to example 7.

Glycerin is used in the immersion formulas to impart soft-moist texture to the processed vegetables by its ability to bind and hold water. Sorbitol can also impart similar functionality; however. sorbitol is not as soluble in water as glycerin and is sweeter than glycerin. Consequently, it is less preferred. Sensory tests have indicated that glycerin concentrations of up to about 10% of the weight of immersion liquid do not create an oily or a metallic taste. Nevertheless, glycerin is typically expensive (80 cents per lb. vs. 10 cents per lb. for corn syrup). Therefore, at present, using a high percentage of glycerin would not only adversely affect flavor, but costs would increase as well.

The immersion solution of the present invention also employs a lower amount of salt (in most cases about 1.5% based on the weight of the vegetables) than used in earlier processes. Salt is used to moderate and balance the sweetness imparted from the corn syrup. Salt is typically not needed for sweet corn. Using lower salt levels supports the United States national policy encouraging reduced sodium intake. A high salt concentration can also alter the taste of vegetables.

The Immersion Process

The immersion process is preferably carried out either in a double-jacketed steam kettle, a circulating tank, or a tank having agitating blades. During this process, the vegetables are gently stirred, agitated, or the immersion liquid is re-circulated to increase the soluble solids by the vegetables. The weight of immersion liquid is approximately twice the weight of a vegetable being processed. A slightly higher quantity of immersion liquid than the weight of the vegetable is used to ensure the following: 1) completion of immersion process in about 1 to 2 hours; 2) reduction of surface oxidation of vegetable color from exposure to oxygen; 3) uniform agitation; and 4) prevention of damage to the vegetables during agitation. Using a higher ratio of a vegetable to the liquid is not economical from throughput standpoint.

Next, the immersion liquid is preferably heated to about 120° F.; however, the immersion liquid temperature may range from about 110° F. to about 130° F. This temperature range is to make the ingredients of the immersion liquid fully soluble and also to lower the viscosity of the corn syrup. The individually quick frozen vegetables are added to the immersion liquid. After adding the individually quick frozen vegetables, the temperature of immersion liquid-vegetable mix usually drops down to between about 40° F. to about 50° F. The temperature of the mixture is increased to about 90° F., typically, from a low of about 60° F. to a high of about 90° F., by heating the kettle, preferably, by direct steam and, in the case of a tank, by re-circulating hot water. Lower immersion temperatures for green vegetables, like broccoli, are preferred. The immersion process is monitored every hour by analyzing the Brix content of the vegetables and the immersion liquid (Table 1). When the vegetables reach a certain Brix range, the vegetables are removed from the immersion liquid and placed on a perforated stainless steel drying tray.

TABLE 1

Typical immersion data on sweet corn

| Time | Brix of sweet corn | Brix of immersion liquid | Temperature Of immersion liquid (F) |
|---|---|---|---|
| At start | 23.0 | 60.2 | 120.0 |
| After one hour | 36.2 | 47.2 | 80.0 |
| After two hours | 41.6 | 45.7 | 80.0 |

Rinsing

Next, the vegetables are preferably rinsed gently by spraying with a lower Brix immersion liquid (See example 1 to 7) for about 10 seconds. It thus is a diluted immersion liquid having a Brix lower than the original immersion liquid in the range of from about 20 Brix to about 45 Brix. In an industrial scale production, the rinse solution can be the same as the leftover or the spent immersion liquid. The rinsing of vegetables prevents the vegetables from clumping and matting. It also prevents surface discoloration due to exposure to air.

Spraying

Subsequent to rinsing, a thin coat of high stability oil, such as sunflower oil (calculated on the basis of 0.5% to 0.75% of anticipated dried yield) or other suitable vegetable oils, is preferably sprayed on the vegetables (except broccoli and potatoes). Oil sprayed before drying helps in making a free-flowing, non-sticky processed vegetable. In the case of broccoli and potatoes, similar results are achieved whether or not oil is sprayed on them. Consequently, since oil may affect the feel and flavor of the product, using oil to maintain the fresh vegetable appearance is not necessary, but can be used on broccoli and potatoes if desired.

Drying

Normally, about 5 lb. to about 6 lb. of a vegetable is placed on a drying tray to a depth of about ½ inch. The depth permits uniform heated air to be circulated across the product. In an industrial setting, the vegetables can. be dried in a continuous dryer having moving perforated steel belts. Any other suitable drying method can be used. The vegetables are dried at about 130° F. This low drying temperature minimizes color deterioration. However, for some vegetables, such as red bell peppers, temperatures as high as 170° F. can be used because the red bell pepper color is less susceptible to heat damage as compared to the color of, for example, broccoli. Furthermore, in the case of sweet corn, a higher drying temperature can cause protein denaturation and starch gelatinization causing gumminess and chewyness.

It is possible to dry the vegetables at temperatures lower than 130° F., but drying at lower temperatures takes too much time to be efficient enough for large scale use of the process. In vegetables, like carrots and potatoes, the drying temperature can be raised to about 150° F. without much effect on color, quality, or other taste and flavor characteristics. The vegetables are preferably dried using heated air. Completion of the drying process is determined by analyzing a sample of vegetables from the dryer for water activity (Table 2).

TABLE 2

Typical data on sweet corn drying process

| Time | Dryer Temp (F) | Water activity (Aw) |
| --- | --- | --- |
| At start | 130° | 0.926 |
| After one hour | 130° | 0.836 |
| After two hours | 130° | 0.648 |
| After three hours | 130° | 0.545 |

When the vegetables reach a water activity level of less than 0.6, they are taken out of the dryer and kept at ambient temperatures for about 24 hours to equilibrate prior to packaging. The equilibration is to allow the solids within the vegetables, which are in a state of flux coming out of the dryer, to stabilize so as to impart a free-flowable, non-sticky vegetable texture.

The equilibrated product is analyzed for quality before sorting, metal detecting, and packaging. The product is preferably packaged in a high-density, polyethylene lined corrugated box. The analysis for quality also includes analyzing for microbial quality (Table 3).

TABLE 3

Typical Microbiological data on processed sweet corn

| Total plate count | Less than 100/grams |
| --- | --- |
| Yeast and Mold | Less than 50/grams |
| Coliform | Less than 0.3 MPN/grams |
| Salmonella | Negative/25 grams |

Because of their superior microbiological quality and the high solid content (about 84% to about 92%), these vegetables are excellent value added ingredients, particularly well suited for use in convenience and fast preparation meals. These vegetables are shelf-stable and possess comparable, similar freshness and other attributes to unprocessed vegetables.

Rehydration

Regarding rehydration, the examples show the percent rehydration data on various vegetables. Typically, in order to rehydrate the vegetables produced according to the invention, about 1 part of vegetables produced by the above process is combined with at least about 2 parts water (for example, add 2 oz water to 1 oz processed vegetables). Then, the vegetables are microwaved for at least 2 minutes (potato works better with 3 parts water and about 3. minutes heating). The vegetables may be otherwise heated (i.e., boiling on stove top), however, the cook time will vary according to the method used to heat the vegetables. Subsequently, the water is drained and the rehydrated vegetables are weighed to determine weight gain. The percent weight gain is calculated as weight of rehydrated drained vegetables/initial weight of processed vegetables ×100. Typically, the rehydration weight gain is 1.5 times (or 150%) to 2 times (200%) that of initial processed weight of the vegetables made according to the present invention.

EXAMPLES

Example 1: Typical Process Data for Broccoli Florets
Ingredients: Broccoli Florets, Corn syrup, Glycerin, Salt

| | Typical Data |
| --- | --- |
| I. Data on Broccoli Florets used in the process | |
| 1. Form | IQF (individually quick frozen florets) |
| 2. Size | Approximately 1.0" |
| 3. Color | Uniform green (without any browning) |
| 4. Initial soluble solids (SS) or Brix | 4.8 |
| 5. Initial pH | 6.6 |
| 6. Weight used (#) | 56.31 |
| II. Immersion | |
| 1. Composition of immersion liquid: | |
| a. Corn syrup of 40 Brix | 92.0% |
| b. Glycerin | 6.5% |
| c. Salt | 1.5% |
| 2. Brix of Immersion liquid made | 47.1 |
| 3. Weight of immersion liquid (#) | 100 |
| 4. Immersion time | 2 hours |
| 5. Immersion Temp (F) | 630 |
| 6. Brix of broccoli after immersion | 28.4 |
| 7. Rinse liquid's (used to rinse vegetable before drying) Brix | 32.9 |
| III. Drying | |
| 1. Drying Temp (F) | 130° |
| 2. Drying Time | 4 hours 45 minutes |
| IV. Dried product | |
| 1. Water activity (aw) of dried broccoli | 0.398 |
| 2. Percent moisture of dried broccoli | 10.1 |
| 3. Weight of dried broccoli (#) | 20.0 |
| 4. Percent yield of dried broccoli | 35.5 |
| 5. Brix of dried broccoli | 65 |
| 6. % Rehydration yield (100 × rehydrated wt./dried wt) of dried vegetable | 212 |
| 7. Color | Typical green color of broccoli |
| 8. Taste | Like broccoli, neither sweet nor salty |
| 9. Flavor | Good flavor of broccoli |
| 10. Texture | Soft; not dry or shriveled |
| 11. Flowability | Free-flowing; not sticky |

Note: 1. Brix determined by a refractometer is a measure of Soluble Solids or SS.
2. Corn syrup used is of 62 DE (dextrose equivalent)
3. 62 DE corn syrup contains: 36% glucose; 31% high maltose and 33% higher saccharides.
4. Rehydration was done by microwave heating for 2 minutes: 1 part vegetable with 2 part water.

| Example 2: Typical Process Data for Sweet Corn Ingredients: Sweet corn, Corn syrup, Glycerin, Sunflower oil | |
|---|---|
| | Typical Data |
| I. Data on Sweet Corn used in the process: | |
| 1. Form | IQF (individually quick frozen) |
| 2. Size | whole pieces |
| 3. Color | Golden yellow |
| 4 Initial soluble solids (SS) or Brix | 23.0 |
| 5. Initial pH | 6.1 |
| 6. Weight used (#) | 30 |
| II. Immersion | |
| 1. Composition of immersion liquid: | |
| a. Corn syrup of 55 Brix | 90.0% |
| b. Glycerin | 10.0% |
| 2. Brix of Immersion liquid made | 60.2 |
| 3. Weight of immersion liquid (#) | 60 |
| 4. Immersion time | 2 hours |
| 5. Immersion Temp (F) | 80° |
| 6. Brix of sweet corn after immersion | 41.6 |
| 7. Rinse liquid's (used to rinse corn before drying)Brix | 45.7 |
| 8. Spray with sunflower oil (approx. 0.5% of expected dried yield) | 27.0 grams |
| III. Drying | |
| 1. Drying Temp (F) | 130° |
| 2. Drying Time | 3 hours |
| IV. Dried product | |
| 1. Water activity (aw) of dried sweet corn | 0.545 |
| 2. Percent moisture of dried corn | 8.9 |
| 3. Weight of dried corn (#) | 14.6 |
| 4. Percent yield of dried corn | 48.6 |
| 5. Brix of dried corn | 78.0 |
| 6. Percent rehydration yield (100 × rehydrated wt./dried wt) of dried vegetable | 190.0 |
| 7. Color | Golden yellow color of corn |
| 8. Taste | Same as sweet corn |
| 9. Flavor | Good flavor of corn |
| 10. Texture | Soft; not gummy or chewy |
| 11. Flowability | Free-flowing; not sticky |

| Example 3: Typical Process Data for Red bell pepper Ingredients: Red Bell Pepper, Corn syrup, Glycerin, Salt, Sunflower oil | |
|---|---|
| | Typical Data |
| I. Data on Red Bell Pepper used in the process | |
| 1. Form | IQF (individually quick frozen) |
| 2. Size | Approximately 1/2" diced |
| 3. Color | Uniform red |
| 4. Initial soluble solids (SS) or Brix | 6.4 |
| 5. Initial pH | 6.2 |
| 6. Weight used (#) | 30 |
| II. Immersion | |
| 1. Composition of immersion liquid: | |
| a. Corn syrup of 50 Brix | 90.0% |
| b. Glycerin | 8.5% |
| c. Salt | 1.5% |
| 2. Brix of Immersion liquid | 51.3 |
| 3. Weight of immersion liquid (#) | 60 |
| 4. Immersion time | 1 hour |
| 5. Immersion Temp (F) | 70° |
| 6. Brix of Red pepper after immersion | 31.2 |
| 7. Rinse liquid's (used to rinse vegetable before drying) Brix | 40.5 |
| 8. Sunflower oil spray (0.5% of expected dried yield) | 17.0 grams |
| III. Drying | |
| 1. Drying Temp (F) | 130° |
| 2. Drying Time | 4 hours |
| IV. Dried product | |
| 1. Water activity (aw) of dried Red Pepper | 0.593 |
| 2. Percent moisture of dried red pepper | 15.7 |
| 3. Weight of dried red pepper (#) | 9.0 |
| 4. Percent yield of dried red pepper | 30.0 |
| 5. Brix of dried red pepper | 77.2 |
| 6. Increase in percent rehydration yield (100 × rehydrated wt./dried wt) of dried vegetable | 190.0 |
| 7. Color | Red pepper color |
| 8. Taste | Like red pepper |
| 9. Flavor | Good red pepper taste |
| 10. Texture | Soft |
| 11. Flowability | Free-flowing; not sticky |

| Example 4: Typical Process Data for Green Pea Ingredients: Green Pea, Corn syrup, Glycerin, Salt, Sunflower oil | |
|---|---|
| | Typical Data |
| I. Data on Green Pea used in the process | |
| 1. Form | IQF (individually quick frozen) |
| 2. Size | Whole, small to medium peas |
| 3. Color | Uniform green |
| 4. Initial soluble solids (SS) or Brix | 13.2 |
| 5. Initial pH | 6.2 |
| 6. Weight used (#) | 96 |
| II. Immersion | |
| 1. Composition of immersion liquid: | |
| a. Corn syrup of 50 Brix | 89.0% |
| b. Glycerin | 10.0% |
| c. Salt | 1.0% |
| 2. Brix of Immersion liquid made | 50.4 |
| 3. Weight of immersion liquid (#) | 210 |
| 4. Immersion time | 1 hour |
| 5. Immersion Temp (F) | 90° |
| 6. Brix of green pea after immersion | 36.0 |
| 7. Rinse liquid's (used to rinse vegetable before drying) Brix | 45.0 |
| 8. 0.5% (of expected dried yield) sunflower oil sprayed before drying | 87.0 grams |
| III. Drying | |
| 1. Drying Temp (F) | 130° |
| 2. Drying Time | 3 hours 5 minutes |
| IV. Dried product | |
| 1. Water activity (aw) of green pea | 0.587 |
| 2. Percent moisture of dried green pea | 14.0 |
| 3. Weight of dried green pea (#) | 59.3 |
| 4. Percent yield of dried green pea | 52.4 |
| 5. Brix of dried green pea | 62.0 |
| 6. % Rehydration yield (100 × rehydrated wt./dried wt) of dried vegetable | 184.0 |
| 7. Color | Typical green color of peas |

Example 4: Typical Process Data for Green Pea
Ingredients: Green Pea, Corn syrup, Glycerin, Salt, Sunflower oil

|  | Typical Data |
|---|---|
| 8. Taste | Natural garden pea taste |
| 9. Flavor | Good flavor of green peas |
| 10. Texture | Soft |
| 11. Flowability | Free-flowing; not sticky |

Example 5: Typical Process Data for Green Bell Pepper
Ingredients: Green Bell Pepper, Corn syrup, Glycerin, Salt, Sunflower oil

|  | Typical Data |
|---|---|
| I. Data on Green Bell Pepper used in the process | |
| 1. Form | IQF (individually quick frozen) |
| 2. Size | Approximately 3/8" diced |
| 3. Color | Green |
| 4. Initial soluble solids (SS) or Brix | 6.1 |
| 5. Initial pH | 5.7 |
| 6. Weight used (#) | 80 |
| II. Immersion | |
| 1. Composition of immersion liquid: | |
| a. Corn syrup of 50 Brix | 90.0% |
| b. Glycerin | 8.5% |
| c. Salt | 1.5% |
| 2. Brix of Immersion liquid made | 53.0 |
| 3. Weight of immersion liquid (#) | 160 |
| 4. Immersion time | 2 hours |
| 5. Immersion Temp (F) | 700 |
| 6. Brix of green pepper after immersion | 31.2 |
| 7. Rinse liquid's (used to rinse vegetable before drying) Brix | 36.4 |
| 8. Spray with 0.5% (of expected dried yield) sunflower oil | 45.0 grams |
| III. Drying | |
| 1. Drying Temp (F) | 140° |
| 2. Drying Time | 3 hours |
| IV. Dried product | |
| 1. Water activity (aw) of dried green pepper | 0.611 |
| 2. Percent moisture of dried green pepper | 14.8 |
| 3. Weight of dried green pepper (#) | 27.3 |
| 4. Percent dried green pepper yield | 34.0 |
| 5. Brix of dried green pepper | 62.0 |
| 6. % Rehydration yield (100 × rehydrated wt./dried wt) of dried vegetable | 167.0 |
| 7. Color | Typical green color of dried pepper |
| 8. Taste | Natural pepper taste |
| 9. Flavor | Good flavor of green pepper |
| 10. Texture | Soft |
| 11. Flowability | Free-flowing; not sticky |

Example 6: Typical Process Data for vegetable carrot
Ingredients: Carrot, Corn syrup, Glycerin, Salt, Sunflower oil

|  | Typical Data |
|---|---|
| I. Data on Carrot used in the process | |
| 1. Form | IQF (individually quick frozen) |
| 2. Size | Approximately 3/8" diced |
| 3. Color | Carrot Orange |
| 4. Initial soluble solids (SS) or Brix | 7.2 |
| 5. Initial pH | 6.6 |
| 6. Weight used (#) | 60 |
| II. Immersion | |
| 1. Composition of immersion liquid: | |
| a. Corn syrup of 45 Brix | 91.5% |
| b. Glycerin | 7.0% |
| c. Salt | 1.5% |
| 2. Brix of Immersion liquid | 50.2 |
| 3. Weight of immersion liquid (#) | 120 |
| 4. Immersion time | 2 hours |
| 5. Immersion Temp (F) | 90° |
| 6. Brix of carrot after immersion | 31.6 |
| 7. Rinse liquid's (used to rinse vegetable before drying) Brix | 37.2 |
| 8. Spray with 0.5% (of expected dried yield) sunflower oil | 54.0 grams |
| III. Drying | |
| 1. Drying Temp (F) | 130° |
| 2. Drying Time | 4 hours |
| IV. Dried product | |
| 1. Water activity (aw) of dried carrot | 0.557 |
| 2. Percent moisture of dried carrot | 13.2 |
| 3. Weight of dried carrot (#) | 27.0 |
| 4. Percent dried product yield | 45 |
| 5. Brix of dried carrot | 78 |
| 6. Percent rehydration yield (100 × rehydrated wt./dried wt) of dried vegetable | 149 |
| 7. Color | Good carrot orange color |
| 8. Taste | Natural carrot taste |
| 9. Flavor | Good carrot flavor |
| 10. Texture | Soft |
| 11. Flowability | Free-flowing; not sticky |

Example 7: Typical Process Data for Potato
Ingredients: Potato, Corn syrup, Glycerin, Salt

|  | Typical Data |
|---|---|
| I. Data on Potato used in the process | |
| 1. Form | IQF (individually quick frozen) |
| 2. Size | Approximately 5/8" diced |
| 3. Color | Typical color of potato |
| 4. Initial soluble solids (SS) or Brix | 6.1 |
| 5. Initial pH | 6.3 |
| 6. Weight used (#) | 10 |
| II. Immersion | |
| 1. Composition of immersion liquid: | |
| a. Corn syrup of 50 Brix | 88.0% |
| b. Glycerin | 10.0% |
| c. Salt | 2.0% |
| 2. Brix of Immersion liquid made | 54.3 |
| 3. Weight of immersion liquid (#) | 20 |
| 4. Immersion time | 2 hours |
| 5. Immersion Temp (F) | 75° |
| 6. Brix of potato after immersion | 27.9 |
| III. Drying | |
| 1. Drying Temp (F) | 140° |
| 2. Drying Time | 5 hours |

-continued

Example 7: Typical Process Data for Potato
Ingredients: Potato, Corn syrup, Glycerin, Salt

| | Typical Data |
|---|---|
| IV. Dried Product | |
| 1. Water activity (aw) of dried potato | 0.553 |
| 2. Percent moisture of dried potato | 12.0 |
| 3. Weight of dried potato (#) | 3.5 |
| 4. Percent dried product yield | 35.0 |
| 5. Brix of dried potato | 36.6 |
| 6. Percent rehydration yield (100 × rehydrated wt./dried wt) of dried vegetable | 154.0 |
| 7. Color | Good potato color |
| 8. Taste | Natural potato flavor |
| 9. Flavor | Good potato flavor |
| 10. Texture | Soft |
| 11. Flowability | Free-flowing; not sticky |

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. The method for making high solids containing vegetables comprising the following steps:
    immersing the vegetables in a liquid of predetermined Brix until the vegetables reach a level of about 28 Brix to about 40 Brix wherein the liquid of predetermined Brix comprises about 88% to about 92% of a low sweetness corn syrup comprising a Brix from about 40 Brix to about 60 Brix, about 6.5% to about 10.0% glycerin based on the weight of the immersion liquid, and up to about 2.0% salt based on the weight of the vegetables;
    removing the vegetables from the immersion; and
    drying the vegetables, wherein the vegetables are dried to a water content of about 8% to about 15%, and the water activity of the vegetables is from about 0.4 $A_w$ to about 0.6 $A_w$.

2. The method of making high solids containing vegetables of claim 1 further comprising the step of spraying the vegetables with a vegetable oil prior to drying the vegetables.

3. The method for making high solids containing vegetables of claim 1, wherein the vegetables are dried using hot air having a temperature from about 130° F. to about 170° F.

4. The high solids containing vegetables made according to a process comprising:
    immersing the vegetables in a liquid of predetermined Brix until the vegetables reach a level of about 28 Brix to about 40 Brix wherein the liquid of predetermined Brix comprises about 88% to about 92% of a low sweetness corn syrup comprising a Brix from about 40 Brix to about 60 Brix, about 6.5% to about 10% glycerin based on the weight of the immersion liquid, and up to about 2% salt based on the weight of the vegetables;
    removing the vegetables from the immersion; and
    drying the vegetables to a water content of about 8% to about 15% and the water activity of the vegetables is from about 0.4 $A_w$ to about 0.6 $A_w$.

5. The high solids containing vegetables made according to the process of claim 4, wherein the vegetables are individually quick frozen vegetables.

6. The high solids containing vegetables made according to the process of claim 5, wherein the vegetables are selected from the group consisting of broccoli, corn, green bell peppers, red bell peppers, potatoes, carrots, and green peas.

7. The high solids containing vegetables made according to the process of claim 4 further comprising the step of spraying the vegetables with a vegetable oil prior to drying the vegetables.

8. The high solids containing vegetables made according to the process of claim 7, wherein the vegetable oil is sunflower oil.

9. The high solids containing vegetables made according to the process of claim 4, wherein the vegetables are dried using hot air having a temperature from about 130° F. to about 170° F.

10. The high solids containing vegetables made according to the process of claim 4 further comprising the step of rinsing the vegetable with a diluted immersion medium after the vegetable is removed from the immersion.

11. The process of producing high solids containing vegetables comprising:
    immersing the vegetables in an immersion liquid having a predetermined Brix;
    removing the vegetables from the immersion;
    rinsing the vegetables with a diluted immersion liquid having a Brix lower than the Brix of the immersion liquid to prevent the vegetables from clumping or matting or to prevent surface discoloration of the vegetables due to exposure to air;
    spraying the vegetables with a vegetable oil; and
    drying the vegetables to a water content of about 8% to about 15% and a water activity of about 0.4 $A_w$ to about 0.6 $A_w$.

12. The process of producing high solids containing vegetables of claim 11, wherein the liquid of predetermined Brix comprises about 88% to about 92% corn syrup, about 6.5% to about 10.0% glycerin based on the weight of the immersion liquid, and up to about 2.0% salt based on the weight of the vegetable.

13. The process of producing high solids containing vegetables of claim 12, wherein the vegetables are dried using hot air having a temperature from about 130° F. to about 170° F.

14. The process of producing high solids containing vegetables of claim 11 wherein the diluted immersion liquid used to rinse has a Brix of about 20 Brix to about 45 Brix.

15. The process of producing high solids containing vegetables of claim 11, wherein the vegetables are dried using hot air having a temperature from about 130° F. to about 170° F.

16. The method for making high solids containing vegetables comprising the following steps:
    immersing the vegetables in a liquid of predetermined Brix until the vegetables reach a level of about 28 Brix to about 40 Brix wherein the liquid of predetermined Brix consists essentially of corn syrup, glycerin, and up to about 2.0% salt;
    removing the vegetables from the immersion; and
    drying the vegetables, wherein the vegetables are dried to a water content of about 8% to about 15% and the water activity of the vegetables is from about 0.4 $A_w$ to about 0.6 $A_w$.

17. The method for making high solids containing vegetables of claim 16, wherein the vegetables are individually quick frozen vegetables.

18. The method for making high solids containing vegetables of claim 17, wherein the vegetables are selected from the group consisting of broccoli, corn, green bell peppers, red bell peppers, potatoes, carrots, and green peas.

19. The method of making high solids containing vegetables of claim 16 further comprising the step of spraying the vegetables with a vegetable oil prior to drying the vegetables.

20. The method for making high solids containing vegetables of claim 19, wherein the vegetable oil is sunflower oil.

21. The method for making high solids containing vegetables of claim 20, wherein the liquid of predetermined Brix consists essentially of about 88% to about 92% corn syrup, about 6.5% to about 10.0% glycerin based on the weight of the immersion liquid, and up to about 2.0% salt based on the weight of the vegetable.

22. The method for making high solids containing vegetables of claim 19, wherein the corn syrup is a low sweetness corn syrup having a Brix from about 40 Brix to about 60 Brix.

23. The method for making high solids containing vegetables of claim 16, wherein the vegetables are dried using hot air having a temperature from about 130° F. to about 170° F.

24. The method for making high solids containing vegetables of claim 16 further comprising the step of rinsing the vegetable with a diluted immersion medium after the vegetable is removed from the immersion to prevent the vegetables from clumping or matting or to prevent surface discoloration of the vegetables due to exposure to air.

25. The method for making high solids containing vegetables comprising the following steps:

immersing the vegetables in a liquid of predetermined Brix until the vegetables reach a level of about 28 Brix to about 40 Brix wherein the liquid comprises corn syrup, glycerin, and up to about 2.0% salt based on the weight of the vegetable;

removing the vegetables from the immersion;

rinsing the vegetables with a diluted immersion liquid comprising a Brix lower than the Brix of the immersion liquid after the vegetable is removed from immersion;

spraying the vegetables with a vegetable oil prior to drying the vegetables;

drying the vegetables; and wherein the vegetables are dried to a water content of about 8% to about 15% and the water activity of the vegetable is from about 0.4 $A_w$ to about 0.6 $A_w$.

26. The method for making high solids containing vegetables of claim 25, wherein the vegetable oil is sunflower oil.

27. The method for making high solids containing vegetables of claim 25, wherein the vegetables are individually quick frozen vegetables.

28. The method for making high solids containing vegetables of claim 27, wherein the vegetables are selected from the group consisting of broccoli, corn, green bell peppers, red bell peppers, potatoes, carrots, and green peas.

* * * * *